United States Patent [19]

Bitter et al.

[11] Patent Number: 4,748,288
[45] Date of Patent: May 31, 1988

[54] PROCESS FOR THE SEPARATION OF SOLVENTS FROM HYDROCARBONS DISSOLVED IN THE SOLVENTS

[75] Inventors: Johan G. A. Bitter; Johannes P. Haan; Hendrik C. Rijkens, all of Amsterdam, Netherlands

[73] Assignee: Shell Oil Company, Houston, Tex.

[21] Appl. No.: 877,050

[22] Filed: Jun. 23, 1986

[30] Foreign Application Priority Data

Aug. 30, 1985 [GB] United Kingdom ............... 8521607

[51] Int. Cl.$^4$ ............................................. C10G 73/08
[52] U.S. Cl. .................................. 585/818; 585/819; 208/308; 208/321; 210/500.21
[58] Field of Search ................. 208/33, 308, 321, 332, 208/335; 585/819, 818; 210/500.21, 500.26, 500.33

[56] References Cited

U.S. PATENT DOCUMENTS

| | | | |
|---|---|---|---|
| 3,043,891 | 7/1962 | Stuckey | 260/674 |
| 3,440,204 | 4/1969 | McVannel | 208/308 |
| 3,919,075 | 11/1975 | Parc et al. | 208/180 |
| 4,368,112 | 1/1983 | Thompson et al. | 208/308 X |
| 4,432,866 | 2/1984 | West et al. | 208/308 X |

Primary Examiner—Curtis R. Davis
Assistant Examiner—Glenn Caldarola

[57] ABSTRACT

The invention is a process for the separation of solvents from hydrocarbons dissolved in the solvents which comprises contacting at elevated pressure a feed solution comprising hydrocarbons dissolved in an aromatic solvent and a polar aliphatic solvent with one side of a dense membrane which is substantially impermeable to the hydrocarbons, and which membrane comprises a layer of a halogen-substituted silicon compound, and recovering the solvents from the other side of the membrane.

19 Claims, 1 Drawing Sheet

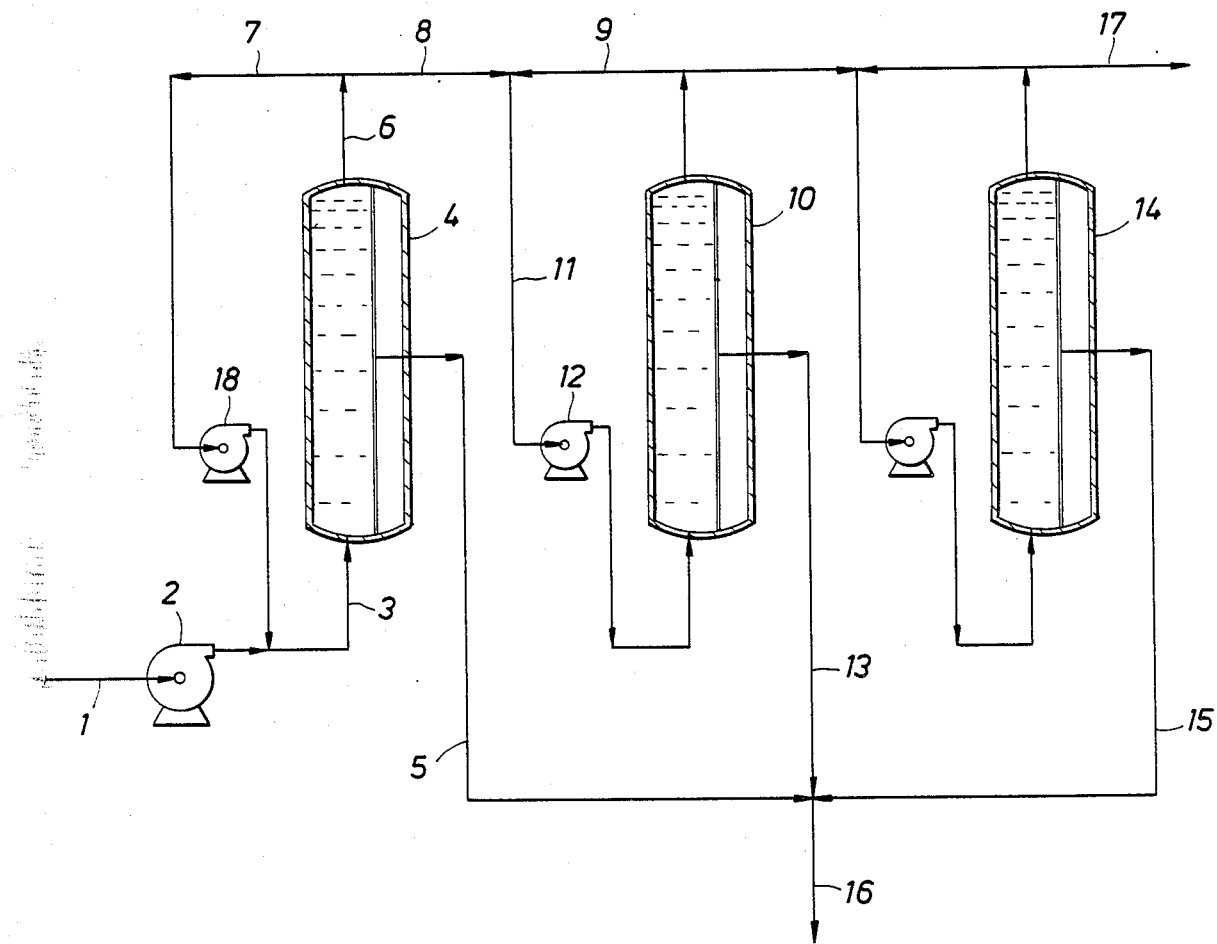

PROCESS FOR THE SEPARATION OF SOLVENTS FROM HYDROCARBONS DISSOLVED IN THE SOLVENTS

FIELD OF THE INVENTION

The invention relates to a process for the separation of solvents from hydrocarbons dissolved in the solvents and to supported membranes suitable for use in the process.

BACKGROUND OF THE INVENTION

It has been known for many years that feed solutions comprising various hydrocarbon compounds and a solvent may be separated by contacting such a feed solution with one side of a membrane and recovering one or more hydrocarbon compounds and, in some cases solvent, from the other permeate side of the membrane.

It is also known that a solvent may be applied in the feed solution to increase the rate of permeation of organic compounds through particular elastomeric membranes. The applied solvent causes the membrane to swell to such an extent that (polymeric) organic compounds having relatively high molecular weights (e.g. above 1000) will permeate together with the solvent through relatively thick barrier membranes on the order to millimeters. Such a process is disclosed in U.S. Pat. No. 3,440,264 where organo-polysiloxanes such as 3,3,3-trifluoropropyl methyl siloxane are used for separation membranes. The applied solvent is not separated in such a process; hydrocarbons remain present in the solvent either at the permeate side of the applied membrane and at the feed side. The patent does not disclose the use of a combination of aromatic and polar aliphatic solvents to render polysiloxane membranes substantially impermeable to hydrocarbon oils.

Surprisingly, it has now been found that a particular combination of solvents, i.e. an aromatic solvent together with a polar aliphatic solvent, can be separated with excellent selectivity from dissolved hydrocarbons such as oil fractions. The separation is effected by applying a dense substantially hole free membrane which is substantially impermeable to the hydrocarbons. The membrane comprises a layer of a halogen-substituted silicon compound as defined below.

It has also been found that the rate of permeation of the solvents through the membrane, the flux, can be susprisingly high in the process according to the invention.

SUMMARY OF THE INVENTION

The present invention is a process for the separation of solvents from hydrocarbons dissolved in the solvents which comprises contacting at elevated pressure a feed solution comprising hydrocarbons dissolved in an aromatic solvent and a polar aliphatic solvent with one side of a dense membrane which is substantially impermeable to the hydrocarbons and which membrane comprises a layer of a halogen-substituted silicon compound comprising units according to the general formula:

$$-\underset{\underset{R^1}{|}}{\overset{\overset{R^2}{|}}{Si}}-O-$$

wherein $R^1$ is selected from the group consisting of halogen, halogen-substituted alkyl, halogen-substituted aryl, and halogen-substituted arylalkyl moieties, $R^2$ is selected from the group consisting of hydrogen, halogen, alkyl, aryl, arylalkyl, halogen-substituted alkyl, halogen-substituted aryl, and halogen-substituted arylalkyl moieties, and recovering the solvents from the other side of the membrane.

BRIEF DESCRIPTION OF THE DRAWING

The sole FIGURE illustrates the preferred process flow scheme employed in this membrane separation process.

DESCRIPTION OF THE INVENTION

Contact with a polar aliphatic solvent can cause a halogensubstituted silicon-comprising membrane to swell excessively, on the order of hundreds of volume percent compared with the solvent free material. For the separation of an hydrocarbon oil dissolved in a solvent, this leads to an unacceptably low selectivity for separation ($\alpha$) defined as:

$$\alpha = \left(\frac{Y}{X}\right)_{solvent} \times \left(\frac{X}{Y}\right)_{oil}$$

wherein X=concentration in the feed solution and Y=concentration in the permeate recovered at the "other side" of the membrane. In the presence of a feed solution comprising an aromatic solvent, in addition to hydrocarbons and a polar aliphatic solvent, the membrane layer will swell to such an extent that both an excellant selectivity as well as a high solvent flux through the membrane can be attained.

In order to show the desirable characteristics in the solvent separation process according to the present invention it is required that the membrane comprise halogen moieties such that in the formula which represents the units present in the silicon compound of the membrane, $R^1$ comprises halogen as such or in the form of a halogen-substituted alkyl, aryl, or arylalkyl moiety. The term aryl refers here to any aromatic moiety. An halogensubstituted alkyl moiety is preferred for $F^1$ in this context, in particular a 3,3,3-trihalogen propyl moiety. Most preferably the membrane applied in the process according to the invention comprises fluorine-substituted moieties such as a 3,3,3-trifluoropropyl moiety. $R^2$ preferably represents a methyl moiety.

The membrane suitably comprises the halogen-substituted silicon compound as described above in the from of a cross-linked homopolymer, however, a copolymer of the silicon compound and an elastomeric prepolymer such as an organo-polysiloxane compound may be used instead. The membrane layer which comprises the halogen-substituted silicon compound suitably has a thickness from about 0.1 to about 100 $\mu$m, and preferably from about 1 to about 10 $\mu$m, in order to attain a relatively high permeate flux when the membrane is applied in the solvent separation process according to the present invention.

The use of reinforcing filler in the membrane layer comprising the silicon compound is preferably avoided because of the negative influence on the permeability of the membrane layer. A membrane with adequate strength for the present purpose can be obtained by supporting the silicon layer by means of a porous support which may comprise a layer of any suitable material, such as cloth, wire net or glass fibers; a porous propylene supporting layer is preferred in view of the adhesive bond which can be attained between the nonselective polypropylene layer and the dense, selective silicon-comprising membrane layer. Said polypropylene supporting layer suitably has a thickness from about 10 to about 500 μm, preferably from about 15 to 100 μm. In some cases it may be advantageous to apply at least one extra layer between the dense, selective silicon membrane layer and a porous support. This intermediate layer is suitably a dense, highly permeable layer with a good bonding capacity for both the silicon layer and the support.

Dense membrane layers comprising a halogen-substituted silicon compound suitable for use in the solvent separation process according to the invention may be prepared by any method known in the art. A suitable method of preparation is solvent casting which first involves forming a solution of a polymer or a prepolymer of the desired membrane compound in a solvent to which a surface active agent is usually added. The solution is cast onto a liquid support to produce a thin layer which is subsequently dried by evaporation of the solvent present in the (pre)polymer solution. The applied solvent is generally substantially immiscible in the liquid support to avoid reducing the surface tension of the liquid support, which leads to instability of the developing membrane and possibly generates holes in the membrane.

The above-mentioned dense membranes are preferably prepared by means of a particular form of solvent casting wherein a solvent is applied which is more or less soluble in a polar liquid support such as water. This shortens the membrane solidification time substantially because not all of the solvent has to be removed from the membrane-forming layer by means of evaporation. There also appears to be no need for a surface active agent such as a dispersant where a solution is used which comprises a prepolymer of a halogen-substituted silicon compound and a ketone.

It is possible to use a liquid support in which a small amount of the applied solvent is already present before the solution which comprises the applied solvent and the (pre)polymer spread out and are allowed to desolvate. A previous requirement for continuous refreshing of (part of) the liquid support, resulting in an uneven surface of the support, is thereby eliminated.

Water is a preferred supporting liquid, when used in combination with a prepolymer which can be crosslinked in the presence of water. Most preferably a prepolymer solution of 3,3,3-trifluoro propyl methyl siloxane in 3-heptanone is allowed to spread out over a water surface in the absence of a spreading agent and form a cross-linked, dense membrane. After spreading and desolvation, the dense fluorosilicon membrane can be transferred onto a porous polypropylene supporting layer to provide a membrane with sufficient strength to withstand the pressures prevailing in reverse osmosis units.

The process according to the present invention is well suited for applications involving a feed solution comprising hydrocarbons dissolved in an aromatic solvent and a polar aliphatic solvent. Aromatic refers here to any aromatic moiety. Preferred aromatic solvents include benzene and toluene. Toluene is the most preferred aromatic solvent. Aliphatic refers here to straight and branched, saturated and unsaturated hydrocarbon chains, that is alkyl, alkenyl, or alkynyl. The most preferred polar aliphatic solvent is methyl ethyl ketone. An example of an application suitable for the present invention is solvent dewaxing of hydrocarbon oils. In a solvent dewaxing treatment of an hydrocarbon oil, a toluene/methyl ethyl ketone solvent mixture is added to a wax-containing oil, followed by wax removal (e.g. by means of filtration).

The solvents are usually recovered from the dewaxed hydrocarbon oil in a conventional flashing process with high energy consumption. With the process according to the present invention it is possible to reduce the energy consumption considerably by recovering a major portion of the solvents via membranes and separating only the remaining portion of solvents by conventional means.

Since the present invention is essentially a reverse osmosis process in which the pressure applied at the side of the membrane which is in contact with the feed solution has to be higher than the pressure at the permeate side of the membrane, some energy is required to operate a feed pump when the feed solution is not available at the desired pressure. The pressure differential between both sides of the applied membrane is suitably from about 2 to about 100 bar, and preferably from about 10 to about 80 bar.

The temperature at which the present process is carried out may vary within a wide range and is not critical as long as the applied membranes can withstand the operating conditions. A feed solution temperature from about −25° C. to about 100° C. is suitable in most cases whereas a temperature from about −20° C. to about 50° C. is preferred when solvents are to be recovered from dewaxed hydrocarbon oils.

The weight ratio of the aromatic solvent : polar aliphatic solvent in the feed solution is suitably from about 0.1 to about 10, and preferably from about 0.5 to about 3. The weight ratio of the solvents : dissolved hydrocarbons in the feed solution is suitably from about 0.5 to about 5, and preferably from about 1 to about 3. A weight ratio of solvents : dissolved hydrocarbons of less than about 0.5 usually has a negative influence on the performance of the applied membranes, reducing the solvent flux through the membrane to an undesirably low level.

Because of the above-mentioned influence of the weight ratio of solvents: hydrocarbons in the feed solution on the solvent flux it is preferred to carry out the process according to the invention with a number of membrane units in a series-flow set-up, thus increasing the oil-content of the feed solution gradually in subsequent membrane units and maintaining a relatively high solvents ratio in the upstream membrane units. This way the total required membrane area can be reduced in comparison with a single-stage membrane separation process for a given quantity of feed solution to be treated. In order to avoid, or at least reduce fouling and concentration polarization of the membranes, the feed solution is preferably passed along one side of a membrane with a sufficiently high velocity and subsequently passed along one side of at least one following membrane.

In order to better prevent concentration polarization, a part of the feed solution which has been passed along one side of a membrane is preferably recirculated by reintroducing the part into the feed solution to be passed along the side of the same membrane.

Various types of membrane units may be applied in the process according to the present invention, such as a flat sheet or a tubular membrane unit. However, such configurations require a relatively large amount of space because their packing density (m² membrane/m³ apparatus) is low. Preference is given to the application of spirally wound—or hollow fiber—membranes which have a good pressure resistance and a high packing density.

The invention is further illustrated by the following Example.

EXAMPLE

The process according to the present invention is carried out in a preferred embodiment schematically depicted in the FIGURE. A feed solution (stream 1) comprising 300 tons/day of dewaxed bright stock (hydrocarbon oil obtained by dewaxing a vacuum distillate) and 1720 tons/day of solvents (containing equal amounts of weight of methyl ethyl ketone and toluene) is pumped (via pump (2) and line (3)) at a pressure of 40 bar and a temperature of 30° C. to the first membrane unit (4) where the feed stream is separated into permeate stream (5) (substantially containing solvents) and a stream (6) which is split into streams (7) and (8). Stream (7) is recycled via pump (18) to feed stream (3). Stream (8) is combined with recycle stream (9) from the second membrane unit (10) into stream (11) and passed via pump (12) to said second membrane unit from which permeate stream (13) is withdrawn. The separation process is continued in a third membrane unit (14) operating in a similar manner as the two previously described units. From said unit (14) a permeate stream (15) is withdrawn and combined with permeate streams (5) and (13) to stream (16) which amounts to 1270 tons/day of a mixture of methyl ethyl ketone and toluene comprising less than 1% by weight of hydrocarbon oil. The solvent mixture of stream (16) can be suitably recycled to a solvent dewaxing unit. Stream (17) amounts to 300 tons/day of hydrocarbon oil and 450 tons/day of solvents i.e. almost three quarters of the amount of solvents originally present in the feed solution is removed in three membrane units which comprise in total 1400 m² membrane. The applied membrane consists of two layers i.e. a porous polypropylene supporting layer with a thickness of 25 μm and a dense top layer of 3,3,3-trifluoropropyl methyl siloxane, with a thickness of 5 μm.

What is claimed is:

1. A process for the recovery of a solvent mixture of an aromatic solvent and a polar aliphatic solvent from hydrocarbons dissolved in the solvent mixture which process comprises contacting at elevated pressure a feed solution comprising hydrocarbons dissolved in the solvent mixture with one side of a dense membrane which is substantially impermeable to the hydrocarbons and which membrane comprises a layer of a halogen-substituted silicon compound having a thickness from about 0.1 to about 100 μm and comprising units according to the general formula:

wherein $R^1$ is selected from the group consisting of halogen, halogensubstituted alkyl, halogen-substituted aryl, and halogen-substituted arylalkyl moieties, $R^2$ is selected from the group consisting of hydrogen, halogen, alkyl, aryl, arylalkyl, halogen-substituted alkyl, halogen-substituted aryl, and halogen-substituted arylalkyl moieties, passing the solvent mixture through the membrane, and recovering the solvent mixture substantially free of the hydrocarbons on the other side of the membrane.

2. The process of claim 1 wherein the membrane comprises halogen-substituted alkyl moieties.

3. The process of claim 2 wherein $R^1$ is a 3,3,3-trihalogen propyl moiety.

4. The process of claim 1 wherein the membrane comprises fluorine-substituted moieties.

5. The process of claim 1 wherein $R^2$ is a methyl group.

6. The process of claim 1 wherein the membrane comprises a copolymer of a halogen-substituted silicon compound and an elastomeric prepolymer.

7. The process of claim 1 wherein the membrane layer of a halogen-substituted silicon compound has a thickness from about 1 to about 10 μm.

8. The process of claim 1 wherein the membrane layer of a halogen-substituted silicon compound is free of filler and is supported by a porous supporting layer.

9. The process of claim 1 wherein the feed solution has been obtained by subjecting an hydrocarbon oil to a dewaxing treatment with the aromatic solvent and the polar aliphatic solvent.

10. The process of claim 1 wherein the weight ratio of solvents:dissolved hydrocarbons in the feed solution is from about 0.5 to about 5.

11. The process of claim 1 wherein the weight ratio of solvents:dissolved hydrocarbons in the feed solution is from about 1 to about 3.

12. The process of claim 1 wherein the weight ratio in the feed solution of aromatic solvent to polar aliphatic solvent is from about 0.1 to about 10.

13. The process of claim 1 wherein the weight ration in the feed solution of aromatic solvent to polar aliphatic solvent is from about 0.5 to about 3.

14. The process of claim 1 wherein the aromatic solvent is toluene.

15. The process of claim 1 wherein the polar aliphatic solvent is methyl ethyl ketone.

16. The process of claim 1 wherein the applied pressure differential between the side of the membrane contacted with the feed solution and and the other side of the membrane is from about 2 to about 100 bar.

17. The process of claim 1 wherein the applied pressure differential between the side of the membrane contacted with the feed solution and and the other side of the membrane is from about 10 to about 80 bar.

18. The process of claim 1 wherein the feed solution is passed along one side of a membrane and subsequently passed along one side of at least one following membrane.

19. The process of claim 1 wherein part of the feed solution passed along one side of the membrane is reintroduced into the feed solution to be passed along the side of the membrane.

* * * * *